United States Patent [19]

Clinton

[11] 3,757,578
[45] Sept. 11, 1973

[54] TURBINE METER HAVING IMPROVED ACCURACY
[75] Inventor: William D. Clinton, Tulsa, Okla.
[73] Assignee: Signet Controls, Inc., Tulsa, Okla.
[22] Filed: Nov. 5, 1971
[21] Appl. No.: 195,974

[52] U.S. Cl. .............................................. 73/231 R
[51] Int. Cl. .............................................. G01f 1/10
[58] Field of Search ............... 73/229, 231 R, 231 M

[56] References Cited
UNITED STATES PATENTS
3,518,881   7/1970   Erickson ............................ 73/231 R
3,248,944   5/1966   Karlby et al. ....................... 73/231 R
FOREIGN PATENTS OR APPLICATIONS
738,431   10/1955   Great Britain ....................... 73/231

Primary Examiner—Richard C. Queisser
Assistant Examiner—Arthur E. Korkosz
Attorney—Head & Johnson

[57] ABSTRACT

The conventional axial flow turbine type liquid meter has a tubular casing and a streamlined cylindrical core coaxial with the cylindrical casing. The cores are generally made in two parts which are separated with a rotatable turbine wheel in between, with blades which are operated by the liquid flow in the annular portion between the core and the casing. Such meters are found to be nonlinear when used with high viscosity liquids. In general they show a greater flow than the true flow when the viscosity is high. It is advantageous to introduce a viscous drag on the rotor to compensate for this over-indication.

In this invention the rotor wheel is constructed with a hub, an annular plate perpendicular to the axis of the wheel extending out from the hub and a cylindrical flange mounted on the outside of the annular plate, the flange carrying the plurality of radial blades. This construction forms an annular depression in one or both sides of the wheel.

The invention involves providing an extension tubular portion to the inner end of one or both of the upstream and downstream parts of the central core. These extensions cooperate with the annular depression to provide narrow spacings between the extensions and the depression whereby the viscous liquids in this meter can provide sufficient drag on the wheel to correct for the over-indication. The tubular extensions may be of fixed spacing relative to the wheel or may be of variable spacing controlled by means exterior of the meter.

Means are also indicated for flowing liquid into the drag space of the annular depression to insure that there is always liquid in the drag space of the same type, nature, and viscosity as that flowing through the meter.

8 Claims, 4 Drawing Figures

Patented Sept. 11, 1973

INVENTOR.
WILLIAM D. CLINTON
BY
Head & Johnson
ATTORNEYS

Patented Sept. 11, 1973

INVENTOR.
WILLIAM D. CLINTON

BY *Head & Johnson*

ATTORNEYS 3,757,578

TURBINE METER HAVING IMPROVED ACCURACY

BACKGROUND OF THE INVENTION

1. Field of the Invention

This invention lies in the field of liquid metering devices.

More particularly, it is concerned with axial flow, turbine type meters.

Still more particularly, it is concerned with an improvement in such turbine meters whereby a viscous drag is applied to the turbine rotor so as to provide a more linear indication of the meter with flow for different viscosities of flowing liquid.

2. Description of the Prior Art

There is considerable art in the literature and in the patents covering turbine type flow meters of the axial flow type.

One of the patents on this subject; namely, U. S. Pat. No. 3,248,945, granted to H. Karlby et al. entitled, "VISCOSITY COMPENSATED TURBINE FLOW METER," which was issued May 3, 1966, discusses the problem of nonlinearity of those meters which are required to meter liquids of different viscosity.

In this patent, a number of ways are indicated for compensating for this nonlinearity. These generally provide a cylindrical drum arranged to be rotated within a cylindrical tube with some of the metering fluid arranged to pass through the annular space between the drum and the cylinder.

In general, the apparatus design in the prior art devices is extremely cumbersome, complex, delicate, and expensive.

SUMMARY OF THE INVENTION

These limitations of the prior art devices, such as those of H. Karlby, et al. are overcome, and the objectives of this invention are fully met by the design to be described.

In this invention the central core is divided into two parts, an upstream, streamlined, cylindrical portion and a downstream portion. Both are held in position in the tubular casing by means of radial vanes. They are locked together by a long bolt with a spacer means so that the turbine wheel is free to rotate in the longitudinal space between the two portions.

The invention lies particularly in the design of the rotating turbine wheel and the cores. The turbine wheel provides on one, or both, sides of the wheel, annular depressions between an outer cylindrical flange, a perpendicular annular plate, and a cylindrical hub. The core portions have tubular extensions on the inner ends of one or both of the core portions such that when the instrument is assembled the extensions fit within the annular depressions and provide clearances between the extensions and the rotating wheel, of the desired dimension, so as to provide the viscous drag required.

Means are also provided for introducing liquid flowing through the meter into the annular space or spaces, so that it is caused to flow through the small clearance areas to provide the viscous drag.

It is therefore the primary object of this invention to provide an extremely simple, inexpensive and rugged design of turbine flow meter that has means for compensating the rotating wheel for the viscosity of the liquid being metered.

These and other objects of this invention and a better understanding of the principles of the invention will be evident from the following description taken in conjunction with the appended drawings, in which:

DESCRIPTION OF THE PREFERRED EMBODIMENT

Figure 1:
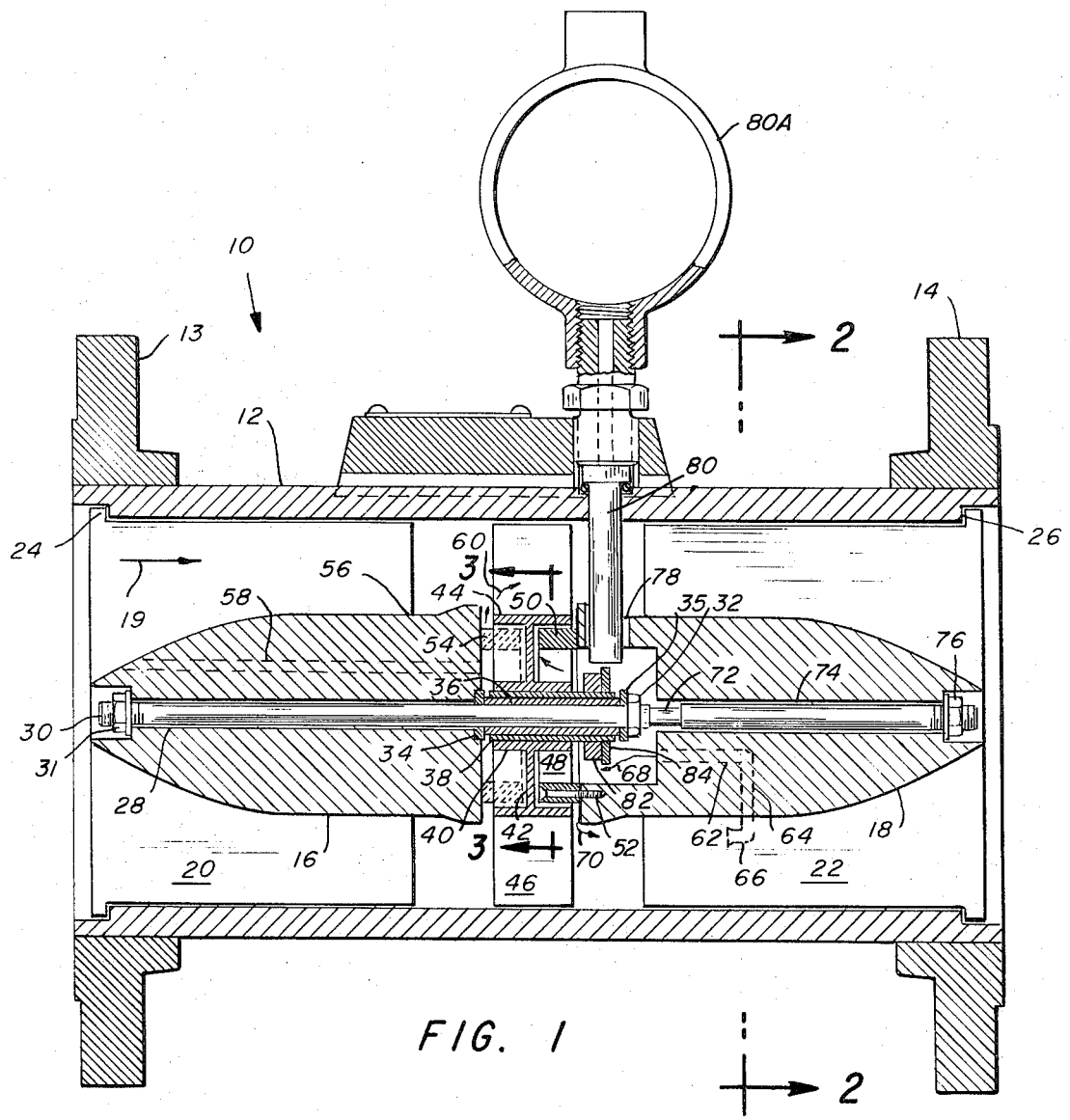
FIG. 1 shows in elevational section the complete details of the improved turbine meter.

Referring now to the drawings, and in particular to FIG. 1, numeral 10 indicates generally the axial flow turbine meter of this invention. It comprises a casing 12 of cylindrical form, with flanges 13 and 14 by means of which it can be inserted into a liquid flow line in a conventional manner. There is a central core which is cylindrical in form and somewhat streamlined. This has an upstream portion 16 and a downstream portion 18 which are separated to provide space for the turbine wheel. The direction of liquid flow is shown by the arrow 19.

The two parts 16, 18 of the central core are supported axially by means of radial vanes 20 and 22, of which there can be any desired number such as 4 which is shown in the drawings. Part 16 has a longitudinal central axial passageway 28 and, in like manner, part 18 has a passageway 74. A long bolt 30 received in passageways 28 and 74 support a bearing cylinder 36 and thrust bearing washers 34 and 35. A step in the diameter 32 of bolt 30 retains the bearing cylinder 36 in proper relationship to part 16 of the central core. Wrench flats 72 on bolt 30 aid in assembly. Nuts 31 and 76 on each end of bolt 30 hold the vanes of the two central core sections 16 and 18 against the ends 24 and 26 of body 10.

Cooperating with the cylindrical bearing 36 is a tube 38 on which is mounted the hub 40 of the turbine rotor. The rotor comprises this cylindrical hub 40, an annular plate 42, which is set perpendicular to the axis, and a cylindrical flange 44. The annular plate is shown in the center of the wheel, although it can be positioned anywhere including either end of the hub.

In the form shown in the drawing it provides two annular cavities on each side of the central annular plate 42 and bound on the inside and outside by the hub and the cylindrical flange, respectively.

A cylindrical tubular extension 50 is shown applied to the inner end of the downstream portion of the central core 18.

While this is shown as being fastened to the core by means of screws 52, it could equally well be a unitary portion of the core itself. Being a separate part, as shown, it can be an exchangable part, where parts of different dimensions providing different clearances between the extension 50 and the annular cavity. This is a way to change the compensation for a different viscosity of liquid. Shown in dashed form as an extension of the leading portion of the core 16 is an extension 54 similar to the extension 50, but fitted into the upstream side cavity in the wall of the rotating wheel. By making these extensions 50 and 54 separable as shown they can be of different sizes providing different clearances. Either one or both can be used at the same time.

It is desirable to insure that the liquid in the annular cavity and in the clearances between the wheel and the extensions has the same viscosity liquid flowing as in the annular space between the core and the casing. One way of accomplishing this is to drill a hole 58 (shown dashed) axially through the leading portion 16 of the core, into the annular space in the wheel. Thus, the forward movement of the liquid in the direction 19 will force some of it through the drilled hole 58 into the annular space, through the clearances, and out into the annular passage and through the wheel blades.

Similarly, two drilled holes 62 and 64 are shown in the downstream portion 18 of the core with an angular portion 66, such that the movement of the liquid through the annular passage will force liquid through the tube 66 and passages 64 and 62 in accordance with the arrow 68 into the annular depression on the downstream side of the wheel, through the apertures between the extension and the wheel, and in accordance with arrow 70 out into the axial flowing liquid in the annular passage.

From this description it will be clear that while the embodiment shows a turbine wheel with a central annular plate and two annular depressions on either side, with core extensions into those depressions from the leading and trailing portions of the core, it would be equally possible to provide extensions to the rotating wheel which would be fitted into annular cavities in the ends of the leading and trailing portions of the core. In the interest of making the rotating turbine wheel as simple and light as possible it is more convenient to provide the annular cavities in the rotor and the extensions as parts of the core as shown.

Mounted on the tube 38 downstream from the rotor wheel, is a permanent magnet 82 and a tooth wheel 84 which cooperate with a detecting element 80 inserted from the outside of the casing through the wall of the casing and through an opening 78 in the central core.

As the rotor turns, it will turn toothed wheel 84. The flux passing to the detecting instrument 80, will vary, thus, a pulsating flux is created which generates an electrical voltage in the detecting element in a manner well known in the art. This pulsating electrical voltage can be amplified and can be used to indicate flow rate as on instrument 80A or to operate or control electrical instruments which can count the pulsations in a given time and determine from that the rate of rotation of the turbine wheel. From a prior calibration, the actual flow rate of liquid through the meter can be determined.

Figure 2:
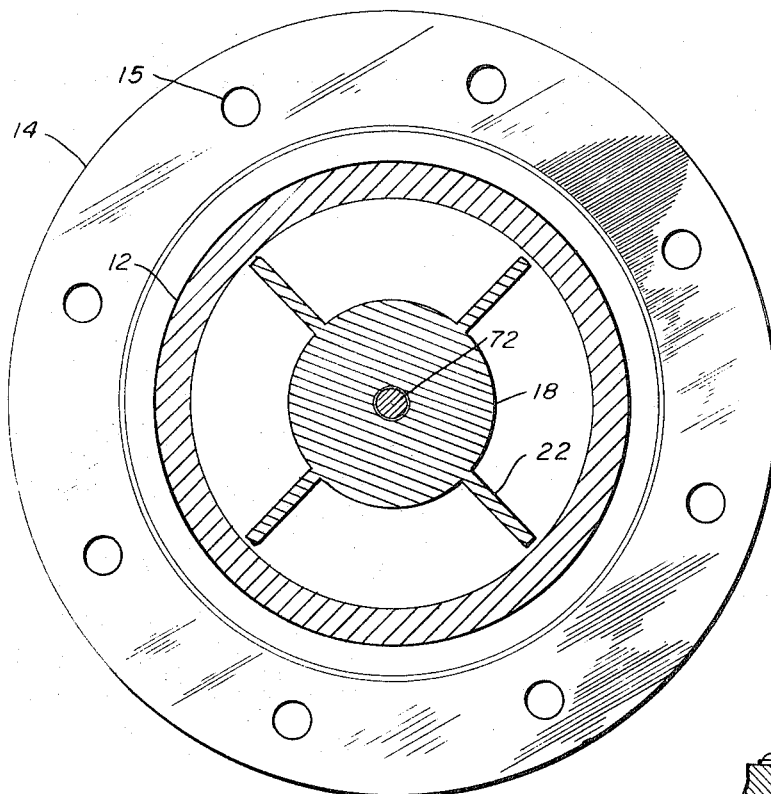
FIG. 2 is a section taken along the line 2—2 of FIG. 1.
Figure 3:
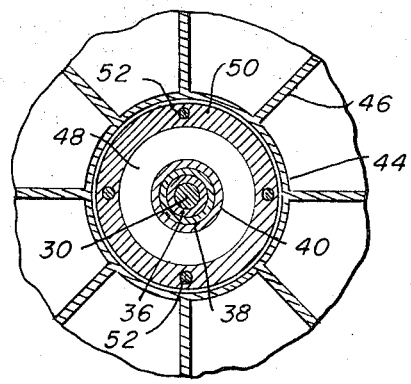
FIG. 3 represents a section of the instrument taken along the line 3—3 of FIG. 1.

FIGS. 2 and 3 show in greater detail some of the features of the central core and of the extension ring 50, all of which has been described in connection with FIG. 1.

Reviewing again the operation of this invention, it is well known in the art that axial flow turbine meters of this type are sensitive to viscosity of the liquid flowing through the meter, such that when the viscosity is high, the meter will indicate a higher flow rate than when the same flow rate of a low viscosity liquid is being measured. In order to correct for this over-indication with high viscosity liquids, this invention involves passing some of the liquid through a restricted passage between the rotating wheel and extensions to the cores, such that when the liquid is viscous, it will provide a drag on the rotor reducing the indication, and when the liquid is not viscous, correspondingly no correction will be applied because none is needed. The apparatus is simple, convenient, cheap, and rugged and does the same job that many other instruments perform, which instruments are far more complicated and expensive than the device of this invention.

Figure 4:
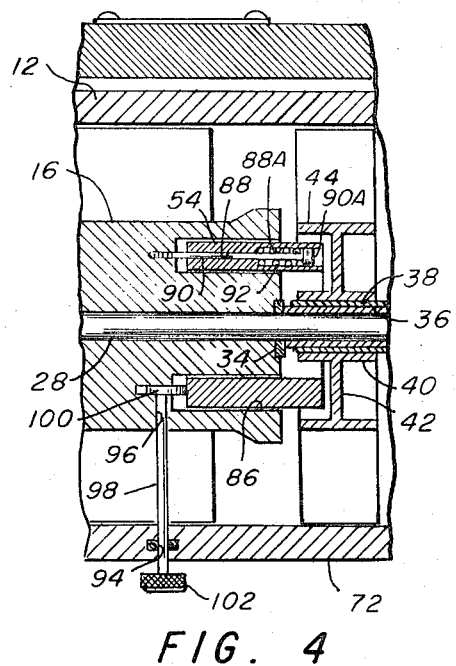
FIG. 4 is a partial cross-sectional view as in FIG. 1 but showing an alternate embodiment including means of adjusting calibration from the exterior of the meter.

FIG. 4 shows an alternate embodiment of the invention in qwhich the clearance between the tubular extension and the rotor is variable by means externally of the meter body. Tubular extension 54 is slidably positioned in a tubular recess 86 in core portion 16. Extension 54 has spaced openings 88 (only one of which is shown) each of which slidably receives a bolt 90 threaded into core portion 16. Each opening 88 includes a larger diameter portion 88A which slidably receives the head 90A of the bolt. A spring 92 is positioned in each opening 88A beneath bolt head 90A resiliantly urging the extension 54 away from rotor annular plate 42.

Rotatably received in an opening 94 in body 12 and an opening 96 in core portion 16 is a shaft 98. Affixed to the inner end of shaft 94 is a cam 100 which engages extension 54. Exterior of body 12 is a handle 102 by which shaft 94 is rotatably positioned, which, by the action of cam 100, adjusts the clearance between extension 54 and the rotor annular plate 42. This enables the drag imposed on the rotor to be adjusted for different fluid viscosities.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In an axial flow turbine meter for metering the flow of liquids, which generally comprise:
   a cylindrical casing;
   a cylindrical streamlined core coaxial with said casing;
   an annular passage between said core and said casing;
   a metering wheel carrying a plurality of circumferentially spaced blades exposed in said annular passage and rotatable about the axis of said casing in response to the flow of said liquid, said core in two parts, one upstream and the other downstream of said metering wheel, and means to indicate the rotation of said wheel, the improvement comprising;
   a. said metering wheel comprising a hub rotatable about a fixed shaft supported by one of said core parts;
   b. cylindrical flange coaxial with said hub supported from said hub means of an annular disk, said flange supporting said plurality of circumferentially spaced radial blades, said hub, said disk, and said flange forming an annular depression on at least one side of said disk, and
   c. extension cylindrical tubular means on the end of at least one of said core parts inserted into said annular depression;

whereby when the liquid being metered has a high viscosity, and the meter tends to indicate a flow rate which is too high, said viscous liquid in the space between said depression and said extension will provide a viscous drag on said wheel to reduce the error in the indicated flow rate.

2. The meter as in claim 1 in which said extension is part of the downstream part of said core.

3. The meter as in claim 2 in which said extension comprises a cylindrical ring attached to the upstream end of the downstream part of said core.

4. The meter as in claim 3 including tubular means to convey liquid from said annular passage into the space inside said ring, whereby said liquid will flow through the space between said ring and said wheel into said passage.

5. The meter as in claim 1 in which said extension is part of the upstream part of said core.

6. The meter as in claim 1 in which the clearance between said extension cylindrical tubular means and said metering wheel annular disk is adjustable.

7. The meter as in claim 1 in which said clearance is adjustable by means extending externally of the meter.

8. The meter as in claim 5 including at least one hole drilled longitudinally in the upstream part of said core leading into the space radially within said extension, whereby part of the liquid approaching said wheel is carried through said hole into said annular depression on the upstream side of said wheel and between said extension and said wheel.

* * * * *